S. D. HEARING.
VALVE TOOL.
APPLICATION FILED JUNE 7, 1919.
1,895,159.
Patented Feb. 25, 1910.
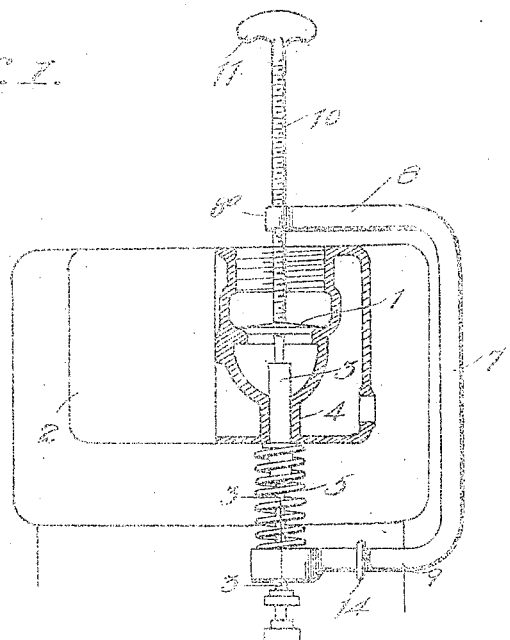
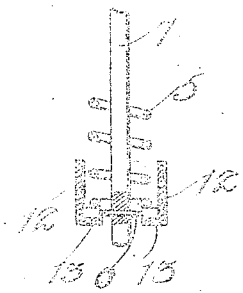
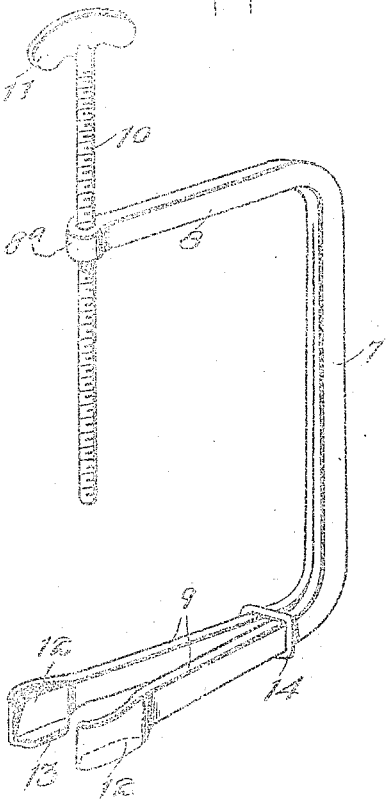
WITNESSES
INVENTOR
S. D. Hearing
ATTORNEYS

UNITED STATES PATENT OFFICE.

SAMUEL DAVID HEARING, OF ZANESVILLE, OHIO.

VALVE-TOOL.

1,295,159.

Specification of Letters Patent.   Patented Feb. 25, 1919.

Application filed June 7, 1918.   Serial No. 238,678.

*To all whom it may concern:*

Be it known that I, SAMUEL DAVID HEARING, a citizen of the United States, and a resident of Zanesville, in the county of Muskingum and State of Ohio, have invented certain new and useful Improvements in Valve-Tools, of which the following is a specification.

My invention is an improvement in valve tools, and has for its object to provide a device of the character specified for releasing motor valve springs, wherein a clamp is provided, having means for clamping the sides of the valve spring and the support under the spring, and having a sliding clamp on the said means, adjustable for all sizes of springs to hold them firm while removing and replacing pins or crescents from valve stems.

In the drawings:

Figure 1 is a side view of the improvement in use, with the valve casing in section;

Fig. 2 is a perspective view of the tool;

Fig. 3 is a section on the line 3—3 of Fig. 1.

The present embodiment of the invention is shown in connection with a valve 1 of a motor 2, the valve having the usual stem 3 which is slidably mounted in a bearing 4 in the motor casing, and a coil spring 5 encircles the stem, between the casing and a stop 6, consisting of a washer and pin, on the stem, the spring acting normally to hold the valve closed.

The improvement comprises a clamp consisting of a C-shaped support, consisting of a body 7 and arms 8 and 9. The arm 8 has an internally threaded bearing 8ª at its free end, through which is threaded a rod 10 having a cross head 11 for convenience in turning the same.

The body of the clamp, as shown more particularly in Fig. 2, is split in the plane of the clamp from near the arm 8 through the body and the arm 9 to form two sections of the arm 9, and these sections normally diverge as shown, due to the resiliency of the material from which the support is formed.

Each of the sections of the arms 9 has an outwardly bent portion 12 at its free end, which is adapted to embrace the spring, as shown in Fig. 2, and each of these outwardly bent portions has an inwardly extending rib or flange 13 at its lower edge for engaging beneath the lower end of the spring to permit the spring to be compressed to release the pin of the stop 6. A ring 14 is mounted to slide on the sectional arm 9 toward and from the outwardly bent portions, to compress the said portions of the spring as shown in Fig. 3.

In operation, the device is arranged as shown in Fig. 1, with the arm 9 of the clamp below the spring and with the arm 8 above the motor casing. The rod 10 is turned outwardly until the flanges 13 of the outwardly bent portions 12 may engage beneath the washer of the stop, as shown in Fig. 3. The ring 14 is moved inwardly to clamp the arm sections on the washer, as shown in Fig. 3, and the end of the rod 10 is engaged with the center of the valve.

The rod is now turned, and it will be evident that the spring will be compressed to permit the removal of the pin of the stop 6 or for any other purpose. The arm 9 is of sufficient length to permit the removal or replacement of the valve and spring without removing the intake or exhaust manifold of the motor.

It will be obvious that the ring 14 could be dispensed with if desired, the resiliency of the arm sections 9 being depended upon to hold the portions 12 in place.

I claim:

A device of the character specified comprising a C-shaped support consisting of a body and arms extending laterally from the ends of the body in the same direction, a rod threaded through the extremity of one arm, the other arm being split to form similar sections, and the split extending through the body to near the first named arm, each of the sections of the last named arm having an outwardly bent portion at its free end provided with an inwardly extending flange at its inner edge, and means mounted to slide upon the said last named arm for moving the sections toward and from each other for the purpose specified.

SAMUEL DAVID HEARING.

Witnesses:
LEWIS C. CROOKS,
SUSIE A. CROOKS.